United States Patent
Schmid

(10) Patent No.: US 6,681,914 B2
(45) Date of Patent: Jan. 27, 2004

(54) COUPLING FOR A BELT RETRACTOR WITH A BELT TENSIONER

(75) Inventor: Johannes Schmid, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/016,502

(22) Filed: Feb. 12, 2002

(65) Prior Publication Data

US 2002/0073514 A1 Jun. 20, 2002

(30) Foreign Application Priority Data

Dec. 15, 2000 (DE) ..................... 200 21 222 U

(51) Int. Cl.⁷ ............................... B60R 22/41
(52) U.S. Cl. ................... 192/223.2; 297/476
(58) Field of Search .............. 192/223.2, 38, 192/54.52, 79; 242/374; 297/476, 479; 188/82.8; 280/806

(56) References Cited

U.S. PATENT DOCUMENTS

| | | | | |
|---|---|---|---|---|
| 2,664,183 A | * | 12/1953 | Payne | 192/38 |
| 4,053,119 A | * | 10/1977 | Doin et al. | 242/374 |
| 4,423,846 A | * | 1/1984 | Fohl | 242/374 |
| 4,750,685 A | * | 6/1988 | Frei | 242/374 |
| 5,451,008 A | * | 9/1995 | Hamaue | 242/374 |
| 5,794,876 A | * | 8/1998 | Morizane et al. | 242/374 |
| 5,918,717 A | * | 7/1999 | Fohl | 242/374 |
| 6,092,634 A | * | 7/2000 | Kremer et al. | 192/38 |
| 6,244,531 B1 | * | 6/2001 | Hori et al. | 242/374 |
| 6,343,759 B1 | * | 2/2002 | Specht | 242/374 |
| 6,364,236 B1 | * | 4/2002 | Fohl | 242/374 |
| 6,390,403 B2 | * | 5/2002 | Specht | 242/374 |
| 6,467,596 B2 | * | 10/2002 | Lay | 192/38 |

FOREIGN PATENT DOCUMENTS

| | | |
|---|---|---|
| DE | 19524501 A1 | 1/1986 |
| DE | 3534048 A1 | 4/1987 |
| DE | 100 20 245 A1 * | 11/2001 |

* cited by examiner

Primary Examiner—Rodney H. Bonck
(74) Attorney, Agent, or Firm—Tarolli, Sundheim, Covell & Tummino L.L.P.

(57) ABSTRACT

A coupling for a belt retractor with a belt tensioner comprises a hub that can be driven by the belt tensioner and has several contact surfaces, and comprises several clamping rollers that are arranged in the hub in such a way that they can be urged radially inwards by the contact surfaces. The coupling further comprises a shaft that can be coupled to the hub by means of the clamping rollers. At least one return element is provided that urges the clamping rollers into a position out of engagement with the shaft.

7 Claims, 3 Drawing Sheets

COUPLING FOR A BELT RETRACTOR WITH A BELT TENSIONER

TECHNICAL FIELD

The invention relates to a coupling for a belt retractor incorporating a belt tensioner.

BACKGROUND OF THE INVENTION

Such a coupling usually comprises a hub adapted to be driven by the belt tensioner and has several contact surfaces, and comprises several clamping rollers that are arranged in the hub in such a way that they are adapted to be urged radially inwards by the contact surfaces, and a shaft adapted to be coupled to the hub by means of the clamping rollers. The belt tensioner serves to tension the vehicle occupant seat belt that is accommodated on a belt spool of the belt retractor when a vehicle accident is detected by a suitable sensor. By tensioning the belt, the so-called belt slack is eliminated so that the buckled-up vehicle occupant participates in the deceleration of the vehicle as soon as possible. The coupling has to fulfill various functions. For one thing, in the starting position, it has to separate the belt tensioner from the shaft that is connected to the belt spool so that the belt spool can rotate freely and so that belt webbing can be unwound from the spool and then wound up on it again. Secondly, when the belt tensioner is activated, it has to establish a connection between the belt tensioner and the shaft that is connected to the belt spool of the belt retractor with as little slippage as possible, so that the tensioning distance provided by the belt tensioner is transferred to the belt spool without losses. The term tensioning distance is used to refer to the length of the belt webbing that is wound up on the belt spool when the belt tensioner is triggered. Finally, the coupling has to once again release the connection between the belt spool and the belt tensioner so that the belt spool can rotate again and the belt retractor can be used once again.

With the couplings known so far, normally three rollers or balls are used which, when the belt tensioner is activated, are clamped between the contact surfaces of the hub and the shaft. Although such a clamp roller coupling reliably couples the hub and the shaft when the belt tensioner drive is activated, it is not possible, however, to release the coupling after the tensioning procedure has ended since the clamping bodies are clamped between the contact surfaces and the shaft in a self-inhibiting manner. This prevents the belt spool of the belt retractor from being able to rotate freely again after a tensioning of the belt webbing.

BRIEF SUMMARY OF THE INVENTION

The object of the invention is to improve a coupling of the above-mentioned type in such a way that the coupling can be reliably released again after the tensioning procedure has ended.

This is achieved in a coupling which comprises a hub adapted to be driven by the belt tensioner and has several contact surfaces, and comprises several clamping rollers that are arranged in the hub in such a way that they are adapted to be urged radially inwards by the contact surfaces. The coupling further comprises a shaft which is adapted to be coupled to the hub by means of the clamping rollers. At least one return element is provided that urges the clamping rollers into a position out of engagement with the shaft. On the one hand, the return element is configured in such a way that, at the beginning of the tensioning procedure, it makes it possible to bring the clamping rollers into such a position between the contact surfaces and the shaft that the hub is reliably coupled to the shaft. On the other hand, the return element is configured in such a way that, when the coupling is released after a tensioning procedure, for example, with the tension in the tensioned belt webbing lessening, the clamping rollers are again moved into their starting position in which they do not engage the shaft. As a result, the belt spool is separated from the belt tensioner again, so that the former can rotate freely.

Preferably, it is provided for that the return element is a spring cage that urges the clamping rollers into the position out of engagement from the shaft. The use of a spring cage makes it possible to mount the clamping rollers in the hub with very little effort, since the clamping cage, together with the pre-assembled clamping rollers, can be installed as one single component. This results in low production costs.

In order to improve the performance of the coupling, it is provided for that the hub is configured with external teeth on which the belt tensioner engages and that the external teeth, as seen in the axial direction, lie within the area defined by the clamping rollers. In other words, the clamping rollers, as seen in the radial direction, are arranged below the teeth and are not staggered in the lengthwise direction with respect to the teeth. This arrangement ensures the shortest possible force flow path from the teeth of the hub to the shaft and prevents the hub from tilting when it engages the clamping rollers, which would have a detrimental effect on the force transmission. Moreover, a tilted hub entails the risk that the clamping rollers will not be released properly after the tensioning has taken place.

Advantageous embodiments of the invention will be apparent from the subclaims.

DETAILED DESCRIPTION OF THE PREFERRED EMBODIMENT

Figure 1:
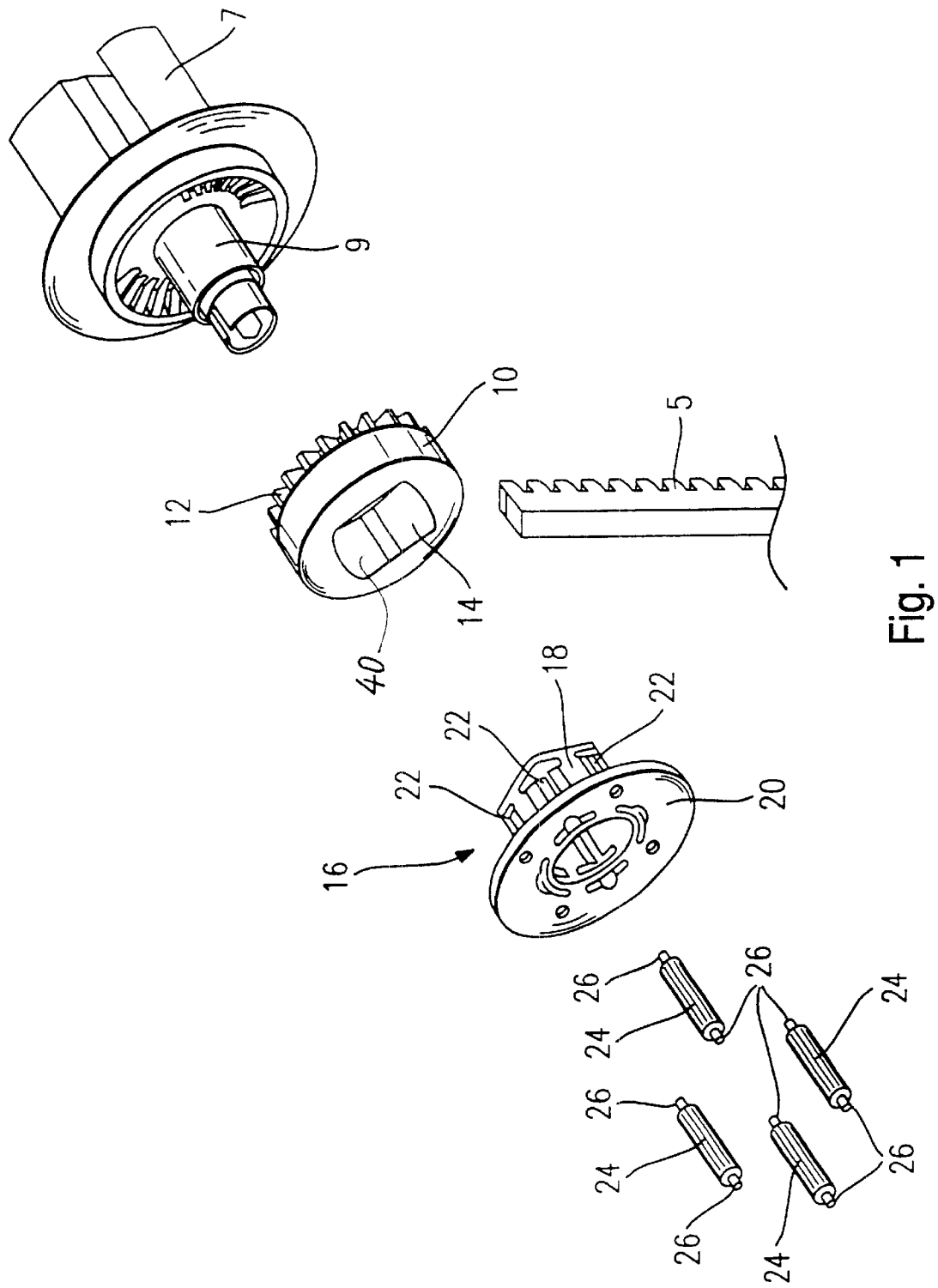
FIG. 1 shows a coupling according to the invention in an exploded view.

FIG. 1 shows a coupling that serves to connect a belt tensioner with a belt spool of a belt retractor. The belt tensioner is indicated here by a schematically depicted toothed rack 5 that can be actuated, for example, by a pyrotechnical charge. Of the belt retractor, only a belt spool 7 is shown here on which a seat belt of a vehicle occupant restraint system can be accommodated. The belt spool 7 is provided with a shaft 9, which is made in one piece with the spool and which can interact with the coupling The coupling consists of a hub 10 made of metal that is provided with teeth 12 with which the toothed rack 5 can interact. The hub 10 has an interior cavity 14 which, in an axial cross-section (see FIG. 2), has an approximately square cross-section with bulged side walls.

The coupling also has a spring cage 16 that is made of plastic and that has the shape of an approximately cylindrical sleeve 18 with a joined collar 20. The spring cage 16 has four seats 22 into each of which a clamping roller 24 made of metal can be inserted. Each clamping roller 24 has a cylindrical body with a holding pin 26 at each axial end.

Figure 4:
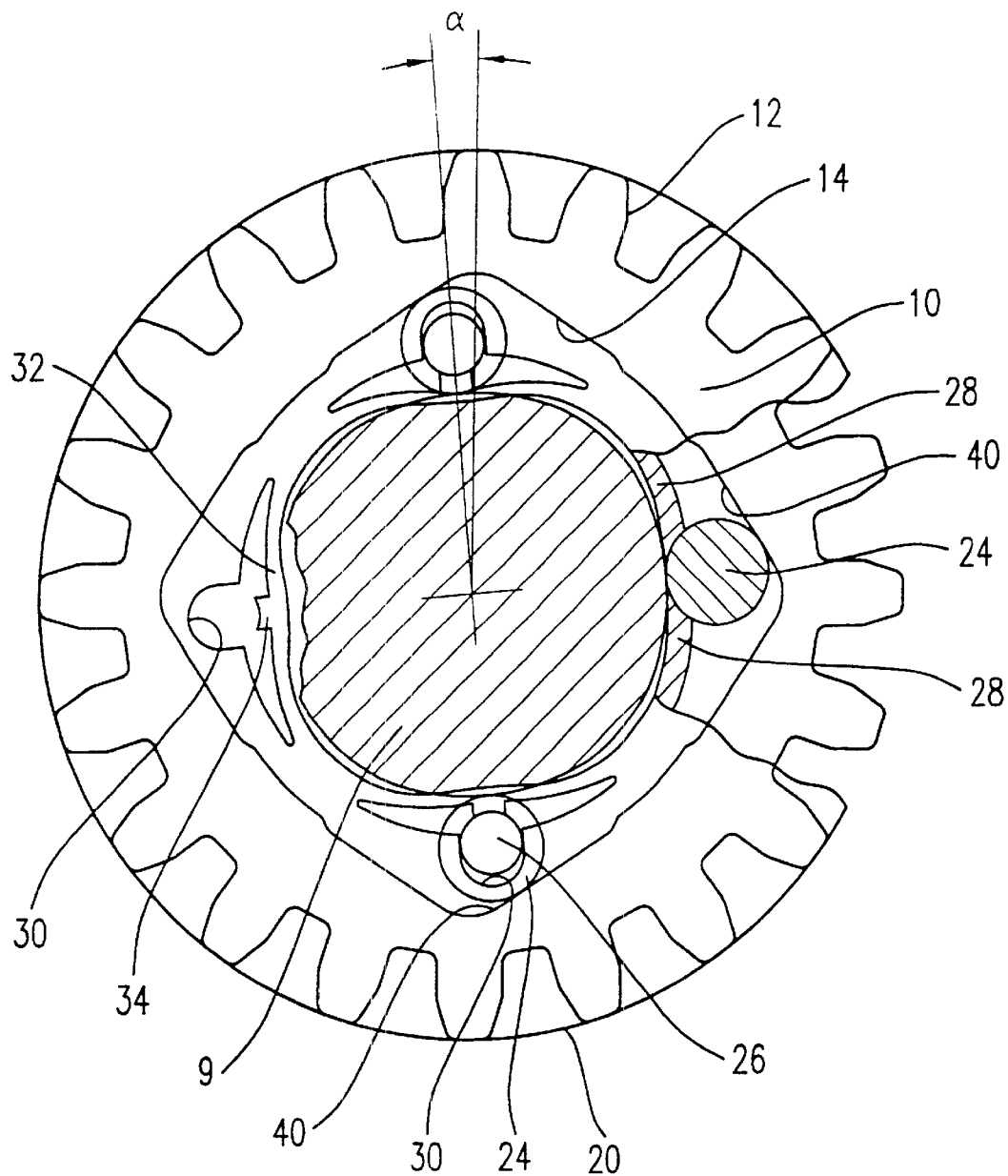
FIG. 4 shows a partial sectional view of the coupling in the coupled position, on an enlarged scale.

The seats 22 for the clamping rollers 24 consist of a recess between two spring tongues 28 which lie opposite each other (see FIG. 4 for the depiction of the clamping roller in the 3 o'clock position), the gap defined between the spring tongues extending along the middle lengthwise axis of the spring cage. Each seat is also provided with two guide slits 30 (see FIG. 4 for the depiction in the 9 o'clock position) that are arranged on the free end of the sleeve 18 as well as in the collar 20 of the spring cage. Vis-a-vis each guide slit there is located a resilient web 32 with a buttress 34. The guide slit 30, together with the spring-suspended buttress 34, serves to movably receive the holding pins 26 of the clamping rollers 24.

Figure 2:
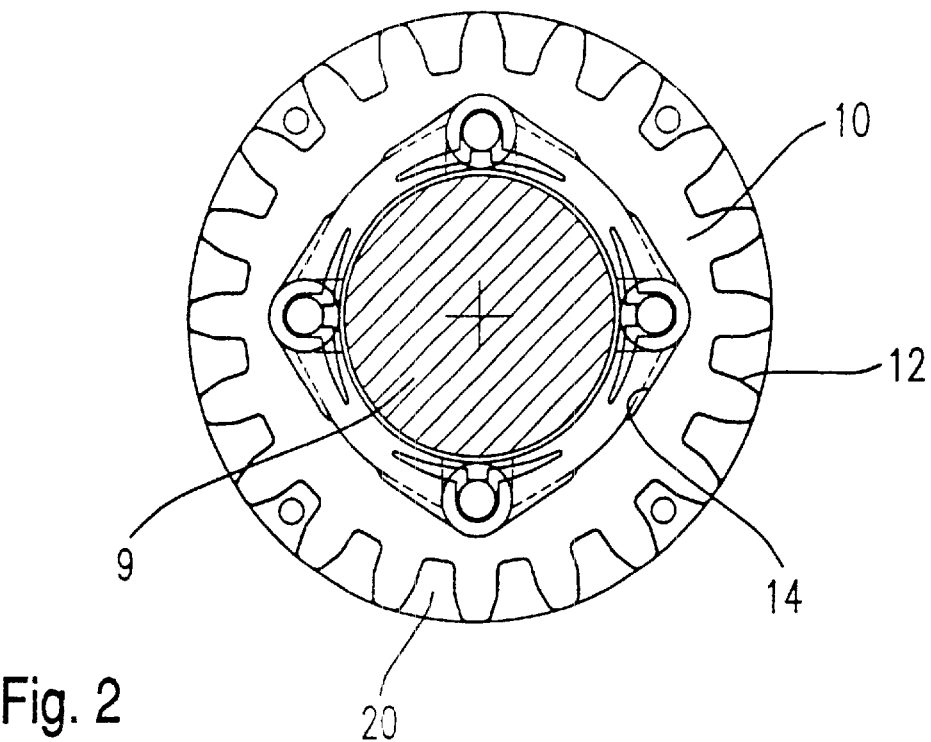
FIG. 2 shows a cross-section through the coupling of FIG. 1 in the starting position.

In the starting position of the coupling, which is shown in FIG. 2, the clamping rollers 24 are located in the corner sections of the interior cavity 14 of the hub 10. Thus, the clamping rollers 24 are at a maximum distance from the middle lengthwise axis of the hub, and they are at a distance from the shaft 9 so that the latter can rotate freely inside the clamping rollers 24.

Figure 3:
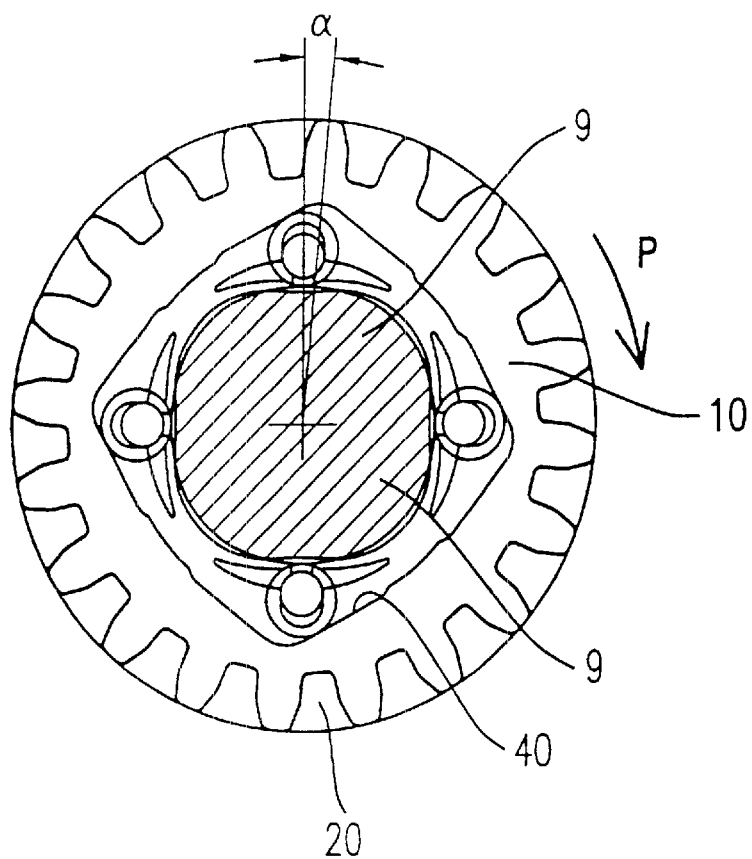
FIG. 3 shows a view corresponding to that of FIG. 2 with the coupling in the coupled position.

When the belt tensioner is activated, it drives the hub 10 in the direction of the arrow P of FIG. 3. As a result of mass inertia, the clamping rollers 24 as well as the spring cage 16 lag behind the rotation so that said spring cage rotates by an angle α relative to the hub 10. Here, the surface areas of the interior cavity 14, which are adjacent to the corners, function as contact surfaces 40 that urge the clamping rollers 24 radially inwards. The clamping rollers 24 are thus pressed against the surface of the hub 9 and create a mechanical connection between the hub 10 and the hub 9. Here, as a result of the inward movement of the clamping rollers, there occurs an elastic deformation of the spring shackles 28 as well as of the webs 32 of the spring cage (see FIG. 4).

Once the tensioning procedure has ended, a minimal relative movement between the hub and the shaft is sufficient for the clamping rollers to be urged by the spring cage back into their starting position, in which they are no longer in connection with the shaft 9. This relative movement can be generated in that the displacement of the belt tensioner is ended before the belt webbing is completely tensioned and the belt spool, due to its mass inertia, continues to rotate in the retracting direction; this is possible since the coupling has no self-inhibition and is easily released. The relative rotation between the hub and the shaft can also be brought about in that, after the belt has been tensioned, the force acting in the belt webbing lessens, so that the retraction spring that is present on the belt tensioner is able to rotate the belt spool somewhat in the wind-up direction. This relative rotation also causes the clamping rollers to be brought back to their starting position by the spring cage.

An essential aspect of the coupling is that, by appropriately selecting the number of clamping rollers as well as their length, it is prevented that the clamping rollers can clamp in a self-inhibiting manner between the contact surfaces of the hub and the shaft during the tensioning procedure. In the present example, four clamping rollers were used the width of which lies in the order of magnitude of 2 mm.

What is claimed is:

1. A coupling for a belt retractor with a belt tensioner, said coupling comprising a hub which is adapted to be driven by said belt tensioner and has several contact surfaces, and comprising several clamping rollers arranged in said hub in such a way that they are adapted to be urged radially inwards by said contact surfaces, and a shaft which is adapted to be coupled to said hub by means of said clamping rollers, at least one return element being provided that urges said clamping rollers into a position out of engagement with said shaft.

2. The coupling according to claim 1, wherein said return element is a spring cage that urges said clamping rollers into said position out of engagement with said shaft.

3. The coupling according to claim 2, wherein said hub is provided with external teeth on which said belt tensioner engages and wherein said external teeth, as seen in an axial direction, lie within an area defined by said clamping rollers.

4. The coupling according to claim 2, wherein four clamping rollers are provided.

5. The coupling according to claim 4, wherein said hub has an interior cavity with an approximately square cross-section and four corners and said contact surfaces are formed by surface areas of said interior cavity that are adjacent to said corners of said interior cavity.

6. The coupling according to claim 2, wherein said spring cage has a seat for each clamping roller and wherein, on each of said seats, two spring tongues are provided which lie opposite each other and on which corresponding clamping roller rests along a middle lengthwise axis thereof.

7. The coupling according to claim 6, wherein, at each axial end, each of said clamping rollers has a holding pin that is received in a guide slit of said seat.

* * * * *

UNITED STATES PATENT AND TRADEMARK OFFICE
CERTIFICATE OF CORRECTION

PATENT NO. : 6,681,914 B2
DATED : January 27, 2004
INVENTOR(S) : Johannes Schmid Page 1 of 1

It is certified that error appears in the above-identified patent and that said Letters Patent is hereby corrected as shown below:

<u>Title page,</u>
Item [22], Filed, "Feb. 12, 2002" should be -- December 10, 2001 --.

Signed and Sealed this

Sixteenth Day of November, 2004

JON W. DUDAS
*Director of the United States Patent and Trademark Office*